United States Patent [19]

Iguchi

[11] Patent Number: 4,751,545
[45] Date of Patent: Jun. 14, 1988

[54] BATTERY CHECK CIRCUIT OF ELECTRONIC STROBE FLASH UNIT OF CAMERA

[75] Inventor: Susumu Iguchi, Yokohama, Japan

[73] Assignee: Ricoh Company, Ltd., Tokyo, Japan

[21] Appl. No.: 915,874

[22] Filed: Oct. 8, 1986

Related U.S. Application Data

[63] Continuation of Ser. No. 686,227, Dec. 26, 1984, abandoned.

[30] Foreign Application Priority Data

Dec. 29, 1983 [JP]  Japan .................................. 58-252010
Dec. 29, 1983 [JP]  Japan .................................. 58-252011

[51] Int. Cl.$^4$ .......................... G03B 17/18; G03B 7/26
[52] U.S. Cl. ..................................... 354/468; 354/418; 354/127.12
[58] Field of Search ................... 354/418, 468, 127.13, 354/127.12

[56] References Cited

U.S. PATENT DOCUMENTS

| | | | |
|---|---|---|---|
| 4,131,351 | 12/1978 | Iwata et al. | 354/468 |
| 4,211,478 | 7/1980 | Huber et al. | 354/468 |
| 4,290,677 | 9/1981 | Baumeister | 354/127.12 |
| 4,431,291 | 2/1984 | Maidu | 354/127.12 |
| 4,460,264 | 7/1984 | Winter | 354/127.12 |
| 4,522,480 | 6/1985 | Kawabata et al. | 354/127.12 |

*Primary Examiner*—Russell L. Adams
*Attorney, Agent, or Firm*—Oblon, Fisher, Spivak, McClelland & Maier

[57] ABSTRACT

A battery check device for checking a battery of a camera having at least a storoboscopic flash unit is disclosed, which functions to compare a first reference time with a charging time of a main capacitor of the flash unit and, when the charging time becomes longer than the reference time, to indicate it as showing a considerable consumption of the battery. The device may have a second reference time which is longer than the first reference time so that the battery is disconnected from the flash unit when the charging time is longer than the second reference time. Thus, the battery can be checked even during a usage of the flash unit and prevented from being discharged completely.

6 Claims, 6 Drawing Sheets

BATTERY CHECK CIRCUIT OF ELECTRONIC STROBE FLASH UNIT OF CAMERA

BACKGROUND OF THE INVENTION

This application is a continuation of application Ser. No. 686,227, filed Dec. 26, 1984 now abandoned.

The present invention relates to a battery check circuit of an electronic strobe flash unit housed in a photographic camera.

Generally, a check of a source voltge of a power source, i.e., battery, of a photographic camera which houses an electronic strobe flash unit is performed by detecting the voltage directly. As is well known, since the source voltage is reduced remarkably during a usage of the electronic strobe flash unit, such direct detection of the source voltage does not always provide a correct source voltage. Therefore, such check is usually performed in a time during which the electronic strobe flash unit is not used.

When it is desired to know a condition of the battery during the usage of the electronic strobe flash unit, it is usual to detect a length of time necessary to charge a main capacitor of the unit up to a level acceptable to operate the unit, the longer the time being the lower the battery voltage. However, such method is generally inaccurate.

In some cameras, the battery is used to drive a motor for taking-up and rewinding a film as well as the electronic strobe flash unit. In such camera, when the battery voltage is reduced by usages of the flash unit to a level below a nominal voltage of the driving motor, it must be replaced by a fresh one even during the usage of the camera. However, since the motor is inoperable, it is impossible to rewind the film. Therefore, in order to prevent an undesirable exposure of the film, there may be cases where the replacement of the battery itself is impossible without using a dark room.

SUMMARY OF THE INVENTION

An object of the present invention is to provide a battery check device for a battery of a camera which houses an electronic strobe flash unit, which is capable of measuring a battery voltage even during a usage of the electronic strobe flash unit.

Another object of the present invention is to provide a battery check device for a battery of a camera which houses an electronic strobe flash unit and a driving motor for taking-up and rewinding a film, which is capable of checking the battery discharge due to the usage of the an electronic strobe flash unit and restricting the discharge so as to allow the motor to be driven lastly thereby.

According to an aspect of the present invention, the battery check device compares a charging time period from a commencement of charging of a main capacitor of an electronic strobe flash unit to a time instance at which the charge voltage of the main capacitor reaches a level in which a flash lightening is possible with a first reference time period which is longer than the time period when the battery is fresh and provides an indication when the charging time period becomes equal to or longer than the first reference time period.

According to another aspect of the present invention, the battery check device has a second reference time period additionally which is longer than a time period from the commencement of the charging of the main capacitor of the flash unit to a completion of the charging and longer than the first reference time period and operates to disconnect the battery when the indication is provided or when there is no completion of charging within the second reference time period.

DETAILED DESCRIPTION OF PREFERRED EMBODIMENTS

Figure 1:
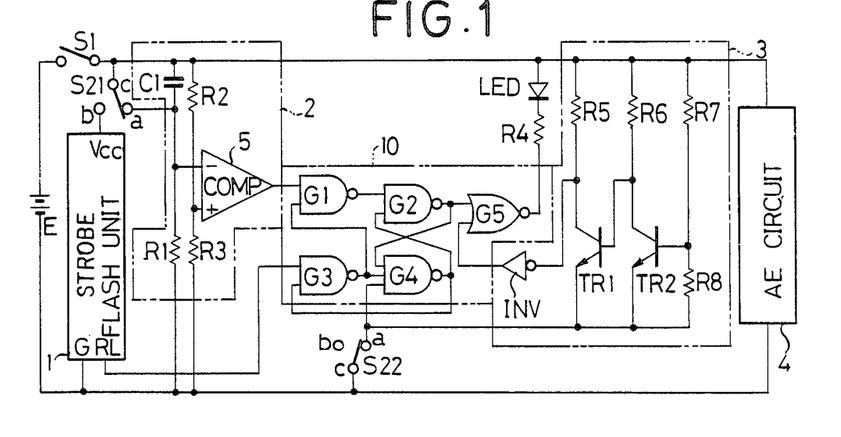
FIG. 1 is a block diagram of an embodiment of a battery check device according to the present invention.

FIG. 1 is a partially blocked circuit diagram of an embodiment of the present invention, which is housed in a photographic camera which is not shown. In FIG. 1, reference numerals 1, 2, 3 and 4 depict an electronic strobe flash unit, first reference time period setting portion, a battery voltage detector and an automatic exposure control circuit, respectively. A main switch S1 is connected in series with a battery E. A switch S21 having a blade c and contacts a and b is ganged with a switch S22 having a blade c and contacts a and b. When the blades c of the switches S21 and S22 contact with the contacts a thereof, respectively, an operation of the camera is switched to an automatic exposure mode (referred to as AE mode, hereinafter) and when the blades c contact with the contacts b, the camera operation is switched to a synchronous flash mode.

The first reference time period setting portion 2 comprises a series connection of a capacitor C1 and a resister R1, a series connection of resisters R2 and R3 and a comparator 5. A (−)terminal and a (+)terminal of the comparator 5 are supplied with a terminal voltage of the resister R1 and a fractional voltage derived from a junction of the resisters R2 and R3, respectively. The capacitor C1 is short-circuited when the switch S1 is turned to the AE mode. An output of the comparator 5 is connected to one of inputs of a NAND gate G1.

The battery voltage detector 3 comprises a series connection of a resister R5 and a transister TR1, a series connection of a resister R5 and a transister TR2, a series connection of resisters R7 and R8 and an inverter INV. A base of the transister TR2 is connected to a junction of the resisters R7 and R8 and a collector thereof is connected to a base of the transister TR1 whose collector is connected to an input of the inverter INV whose inverted output is supplied to one of inputs of a NOR gate G5. The battery voltage detector 3 is grounded only when the switch S22 is in the AE mode position.

Figure 3:
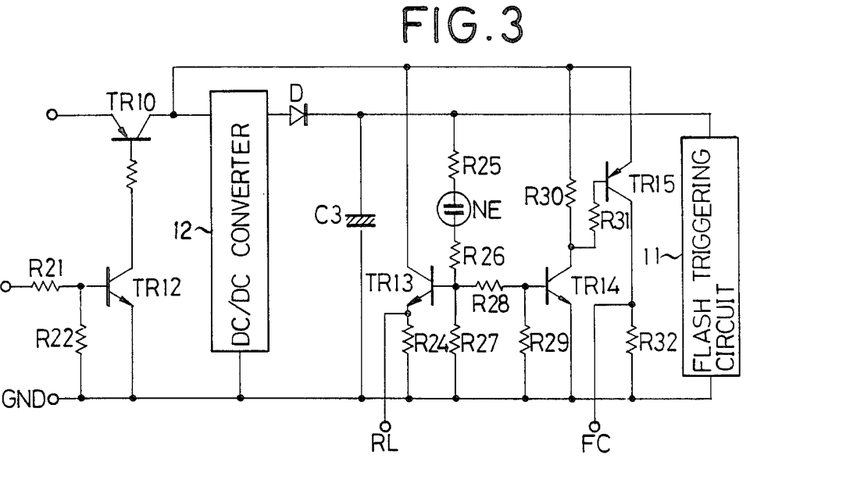
FIG. 3 is a circuit diagram of a storoboscopic flash unit with which the present battery check device cooperates.

The electronic strobe flash unit 1 is shown in detail in FIG. 3. In FIG. 3, a source voltage Vcc of the battery E is applied to a DC/DC converter 12 where a transister TR10 is turned on, to actuate the converter 12. The voltage Vcc is also applied by the turning-on of the transister TR10 to a collector of a transister TR13, a resister R30 connected in series to a collector-emitter circuit of a transister TR14 and an emitter of a transister TR15, respectively. The transister TR10 is turned on when a transister TR12 is turned on by a source control signal SPC to be supplied from a central processing unit (CPU) to be described later.

An amplified D.C. voltage from the DC/DC converter 12 is applied to a main capacitor C3 connected in parallel to a flash triggering circuit 11 and to an indicator circuit composed of a series connection of a resister R25, a neon tube NE, a resister R26 and a resister R27, in the order. The indicator circuit responds to a charge voltage of the main capacitor C3 and indicates by the neon tube NE that the flashing is possible when the charge voltage reaches a certain value.

A junction of the resisters R26 and R27 of the indicator circuit is connected to a base of the transistor TR13 and through a resister R28 to a base of the transister TR14. The base of the latter transister is grounded through a resister R29.

The collector of the transistor TR14 is connected through a resister R31 to a base of the transister TR15. A signal RL indicative of a flash available state is derived from an emitter of the transister TR13 which is connected to a RL input of the CPU. The signal RL is provided when the transister TR13 is turned on by a discharge of the neon tube NE when the charge voltage of the main capacitor C3 reaches a level above which the electronic strobe flashing is possible.

Figure 4:
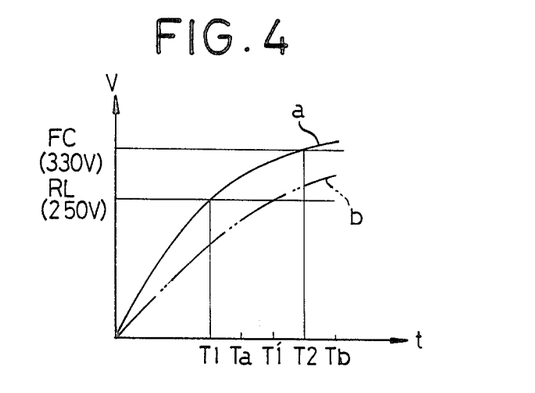
FIG. 4 is a graph showing a charging characteristics of a main capacitor of the flash unit in FIG. 3.

FIG. 4 illustrates the charging characteristics of the main capacitor C3. In FIG. 4, a curve a is the charging of the main capacitor C3 when the source voltage Vcc is as high as a nominal value and a curve b shows the charging when the source voltage is dropped. That is, the flash available level RL is set at a voltage value, e.g., 250V, with which an amount of light which is smaller than a nominal light amount by about 1EV is available, and the signal RL is provided at a time T1.

A collector of the transister TR15 provides a charge completion signal FC at a time instant T2 which is to be supplied to a charge completion signal input of the CPU. The signal FC is available when the main capacitor C3 is fully charged and its voltage reaches an FC level, e.g., 330V, in FIG. 4, in which the nominal light amount is obtainable, causing the transisters TR14 and TR15 to be turned on.

The signal RL is supplied to one of inputs of a NAND gate G3. An output of the gate G3 is connected to one of three inputs of a NAND gate G4 and to the other input of the NAND gate G1 whose output is connected to one of two inputs of a NAND gate G2 the output of which is connected to a second input of the NAND gate G4 and one of inputs of a NOR gate G5. A third input of the NAND gate G4 is grounded when the blade c of the switch S22 is connected to the AE mode side contact a. The output of the gate G4 is connected to the other inputs of the NAND gates G2 and G3.

To an output of the NOR gate G5 a series connection of a light emissive diode LED and a resister R4. The diode LED emits a light when the output of the gate G5 becomes L level.

The gates G1 to G5 constitute a comparator 10 for comparing the first reference time period Ta (FIG. 4) set by the first reference time period setting portion 2 with the time T1 from the commencement of charging of the main capacitor C3 (FIG. 3) to the time instant when the signal RL is available.

An operation of the device in FIG. 1 will be described.

When the switch S21 and hence the switch S22 are in the state shown in FIG. 1, the AE mode is selected. When the main switch S1 is closed under this condition, the source voltage Vcc is applied from the battery E to the AE circuit 4. The source voltage is also applied through the switch S22 to the battery voltage detector 3.

Assuming that the source voltage is as high as the nominal voltage, the voltage derived from the junction between the resisters R7 and R8 is also high enough to bias the base of the transister TR2 to turn it on. When the transister TR2 is turned on, a base-emitter circuit of the transister TR1 is short-circuited causing the latter to be turned off.

When the transistor TR1 is turned off, its collector voltage becomes substantially equal to the battery voltage E, i.e., a H level. The H level of the collector is inverted by the inverter INV to a L level which is supplied to the other input of the gate G5.

On the other hand, since the blade c of the switch S21 contacts with the contact a, the voltage at the ($-$)input of the comparator 1 becomes the same as the battery voltage Vcc and that at the ($+$)input becomes a fraction of the voltage Vcc due to a voltage dividing function of the resisters R2 and R3. Therefore, the output of the comparator 1 is in a L level which is supplied to the gate G1. Consequently, the gate G1 provides a H output. Further since no source voltage is applied to the flash unit 1, the signal RL is in a L level and thus the gate G3 provides a H output. The output of the gate G4 is in a H level since the third input thereof is grounded through the switch S22.

Therefore, all inputs of the gate G2 and H and thus the output thereof is L. Since the both inputs of the gate G5 are L, the output thereof become H, providing a small potential difference between terminals of the diode LED which is not enough to actuate the latter. With the diode LED emitting no light, it can be confirmed that the battery voltage is still high enough.

When the battery voltage Vcc is dropped considerably by discharge, the fractional voltage at the junction between the resisters R7 and R8 and hence the base-emitter voltage of the transister TR2 is low. Therefore, the latter transister is turned off causing the base voltage of the transister TR1 to be high enough to turn the latter transister on. Consequently, the collector voltage of the transister TR1 becomes L which is inverted by the inverter INV. The H output of the inverter INV is supplied to the gate G5. Since the other input of the gate G5 is still kept in the L state, the voltage between the terminals of the diode LED becomes high enough to emit light. The diode LED emitting light indicates the decreased voltage of the battery E.

When the blade c of the switch S21 and hence the switch S22 is connected to the contact b to switch the operation mode to the synchronous flashing, the transisters TR1 and TR2 of the battery voltage detector 3 are floated from the ground potential and the input of the inverter INV becomes in a H level. Therefore, the inverted H level, i.e., L level at the output of the inverter INV is applied to the input of the gate G5. At the same time, the ($-$)input voltage of the comparator 5 of the first reference time period setting portion 2 decreases, the decreasing rate being determined by a time constant of the circuit composed of the capacitor C1 and the resister R1.

Assuming that the voltage Vcc of the battery E is high enough, the main capacitor C3 of the flash unit 1 is charged rapidly to a voltage at which the flash lighting is possible and the unit 1 provides the signal RL which is supplied to the gate G3. On the other hand, the comparator 5 of the first reference time setting portion 2 compares a first reference voltage at the junction between the resisters R2 and R3 which is a fraction of the source voltage Vcc with the voltage at the resister R1 which decreases at a rate determined by the time constant of the circuit composed of the capacitor C1 and the resister R1 and, when the voltage at the resister R1 reaches the first reference voltage, provides a H output which is supplied to the gate G1. At this time, since the reference voltage is a fraction of the voltage Vcc of the battery E, a time period from the commencement of the operation of the flash unit 1 to a time instant at which the comparator 5 provides the H signal is substantially constant regardless of the voltage Vcc of the battery E. Therefore, the signal RL is provided by the flash unit 1 prior to the H signal at the output of the comparator 5 when the battery voltage is high. On the other hand, the outputs of the gates G1, G2, G3 and G4 and H, L, H and H, respectively, immediately after the blade c of the switch S22 is turned to the contact b to establish the flashing mode. Under the conditions, when the signal RL becomes H, the output of the gate G3 becomes L. Therefore, the outputs of the gates G1 and G2 remain H and L, respectively, even if the H output of the comparator 5 is supplied thereafter. Consequently, the both inputs of the gate G5 are L level and the output thereof becomes H, resulting in the diode LED emitting no light, by which it is confirmed that the voltage Vcc of the battery E is still high and usable.

When the voltage Vcc is dropped, the signal RL may be provided at T1 which is delayed from T1 (FIG. 4). Before T', the outputs of the comparator 5, the gates G1 and G2 are reversed to H, L and H, respectively. As a result, the output of the gate G5 becomes L and thus the diode LED emits light, indicating considerable lowering of the battery voltage.

With the H output of the gate 2, all of the inputs of the gate G4 becomes L and, therefore, the one input of the gate 3 becomes L, which is kept unchanged even if the signal RL is supplied to the gate G3 thereafter. Therefore, the diode LED continues to light.

Figure 2:
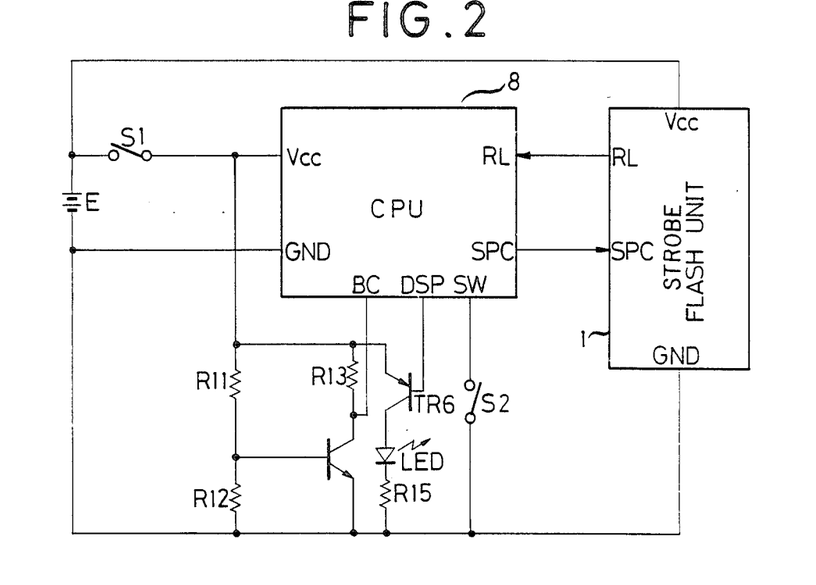
FIG. 2 is a block diagram of another embodiment of the battery check device according to the present invention.

The embodiment in FIG. 1 is constituted with a logic circuit mainly. FIG. 2 shows another embodiment of the present invention, in which the logic circuit is replaced by the CPU mentioned previously.

In FIG. 2, a CPU8 is used instead of mainly the comparator 10. In the embodiment in FIG. L, a battery voltage detector and reference voltage generator are constituted with resisters R11, R12 and R13 and a transistor TR5, a base-emitter voltage of the transistor TR5 being used as the reference voltage. A fraction of the source voltage Vcc derived from a voltage devider composed of the resisters R11 and R12 is supplied to a base of the transistor TR5 whose collector voltage is supplied to a battery check terminal of the CPU8. The reference time setting is performed by the CPU8 according to a program described later.

The CPU8 operates to set a display signal terminal DSP thereof to a L level when the battery check terminal BC becomes a H level. The L signal at the display signal terminal DSP is supplied to a base of a transistor TR6 to turn the latter on.

A photoemissive diode LED and a resister R15 are connected in series with the transistor TR6.

When a switch S2 is closed to make the electronic strobe flash unit 2 ready to operate, the CPU8 provides at its terminal SPC a H signal which is supplied to the flash unit 1 as a charge start signal for the main capacitor C3 of the unit 1. When the voltage of the main capacitor C3 reaches the RL level, it provides the RL signal to the terminal RL of the CPU8.

Upon the signal SPC, the transistor TR12 of the flash unit 1 is turned on. Therefore, the transistor TR10 is also turned on to apply the source voltage Vcc to the DC/DC converter 12 to thereby start the charging of the main capacitor C3.

Figure 5:
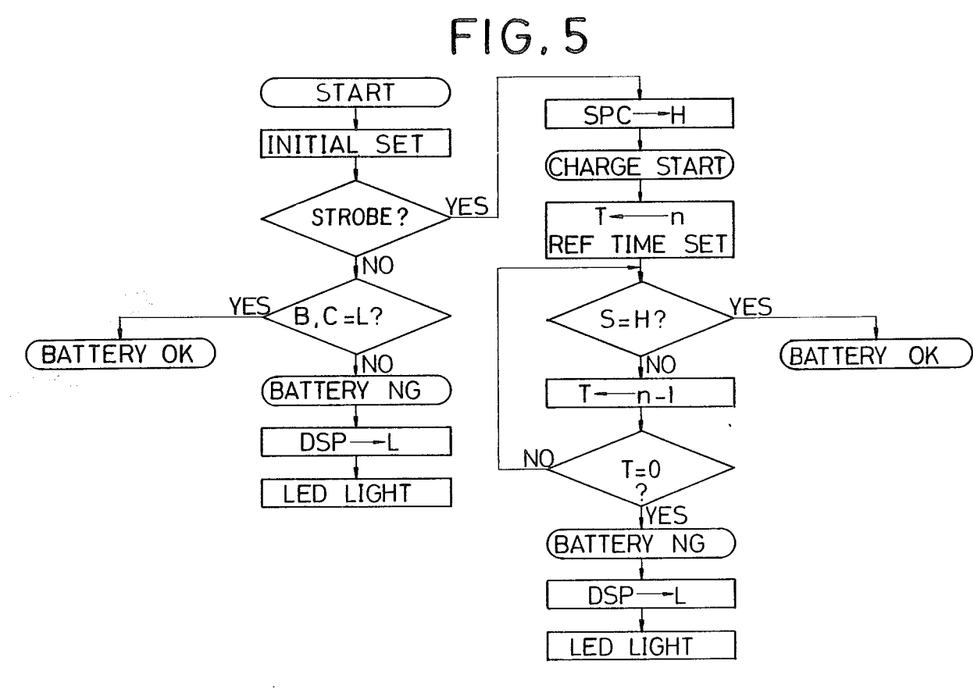
FIG. 5 is a flow-chart of an operation of the battery check device in FIG. 2.

The operation of the embodiment in FIG. 2 will be described with reference to a flow-chart in FIG. 5.

When the flash unit 1 is not used, the switch S2 is opened and the CPU8 checks the signal level at the terminal BC thereof. Assuming that the voltage Vcc of the battery E is high enough, the fractional voltage thereof at the junction between the resisters R11 and R12 is also high enough to turn the transister TR5 on. Therefore, the signal level of the terminal BC of the CPU8 becomes a L level, resulting in no indication provided by the CPU, which indicates that the battery voltage is still high.

On the other hand, when the battery E is discharged and the voltage Vcc is reduced, the transister TR5 is turned off and the signal level at the terminal BC becomes a H level. Upon this, the CPU8 makes its display terminal DSP a L level, so that the transistor TR6 is turned on. Therefore, the photoemissive diode LED emits light, showing the discharged condition of the battery E.

Upon closing the switch S2, the flash unit 1 is made available. That is, with the closure of the switch S2, a terminal SW of the CPU8 is grounded, upon which the CPU8 provides a H signal at its terminal SPC. Therefore, the transisters TR10 and TR12 are turned on to start the charging of the main capacitor C3 of the flash unit 1.

The CPU8 has a certain value n in its counter and a subtraction from the content n of the counter is started at the charge start time.

Assuming that the battery voltage is high, the signal RL is provided by the flash unit 1 which is supplied to the terminal RL of the CPU8 before the content of the counter thereof becomes zero. Upon the signal RL prior to the completion of the reduction of the counter content, the CPU8 does not provide any indication, which indicates that the battery voltage is high.

On the other hand, when the battery voltage is low, the charging rate is decreased and therefore the RL signal is produced after the content of the counter of the CPU8 become zero. Upon the zero content of the counter before the signal RL, the CPU8 provides a L signal at the terminal DSP. Therefore, the transistor TR6 is turned on to light the diode LED, indicating the consumption of the battery E.

Figure 6:
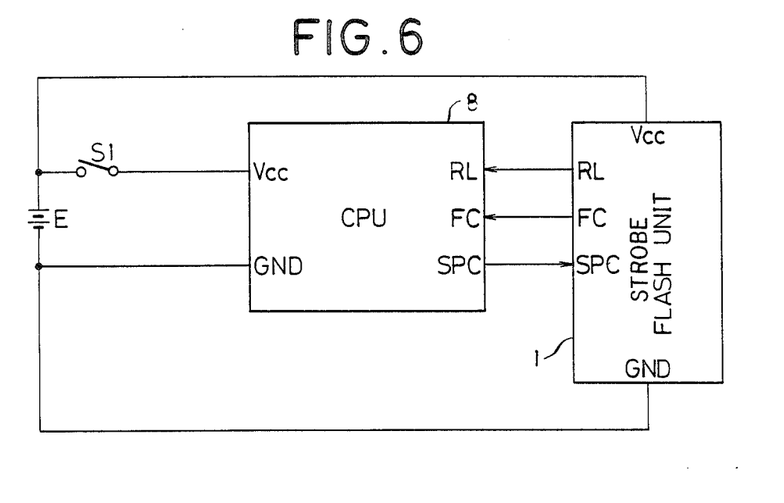
FIG. 6 is a block diagram of another embodiment of the present invention.

FIG. 6 shows another embodiment of the present invention. In this embodiment, the CPU8 includes the first reference time setting portion for setting the first reference time Ta (FIG. 4) and a second reference time setting portion for setting a second reference time Tb (FIG. 4) measured from the start of the charging of the main capacitor C3 or from the provision of the signal RL, the time Tb being later than the time Ta. The CPU8 further comprises an operation control portion which functions to provide a battery control signal SPC when the signal RL is not provided by the flash unit 1 within the first reference time Ta or when the charge completion signal FC is not provided by the flash unit 1 within the second reference time Tb even if the signal RL is produced within the first reference time Ta.

The battery control signal SPC is used to disconnect the flash unit 1 from the battery E.

Figure 7:
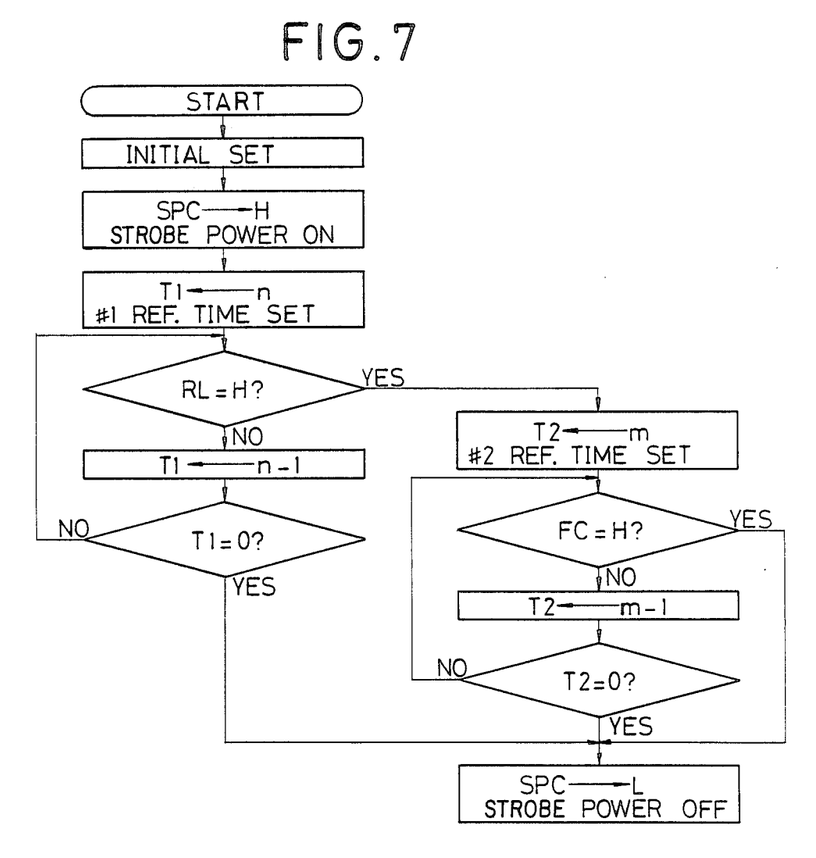
FIG. 7 is a flow-chart of an operation of the embodiment in FIG. 6.

The operation of the embodiment in FIG. 6 will be described with reference to a flow chart shown in FIG. 7.

Assuming that the battery control signal SPC is provided by the CPU8, the transister TR12 is turned on and thus the transister TR10 is turned on. Therefore, the DC/DC converter 12 is actuated to start the charging of the main capacitor C3.

Simultaneously with the charge start of the main capacitor C3, the first reference time Ta is set in the first reference time setting portion of the CPU8.

It is determined whether or not the signal RL is produced within the first reference time Ta and, when the determination is negative, it is decided that the battery voltage is reduced to a level in which the electronic strobe flash light is not available. Upon this decision, the CPU8 changes the state of the battery control signal SPC to a L level to turn the transister TR12 and TR10 off to thereby disconnect the battery E from the flash unit 1. Therefore, the battery E is prevented from being discharged completely.

On the other hand, when the determination is affirmative, the second reference time Tb is set by the second reference time setting portion of the CPU8, on the basis of the provision of the signal RL. Then, it is decided whether or not the charge completion signal FC is provided within the second reference time Tb.

When the signal FC is not provided with the time Tb, the battery E is disconnected from the flash unit 1 to prevent the battery E from being dischanged completely. The battery E is also disconnected from the flash unit 1 when the signal FC is available within the time Tb.

In the embodiment shown in FIG. 6, the second reference time Tb is set as measured from a time when the signal RL is produced. The second reference time Tb may be set on the basis of the start time of the main capacitor charging.

Figure 8:
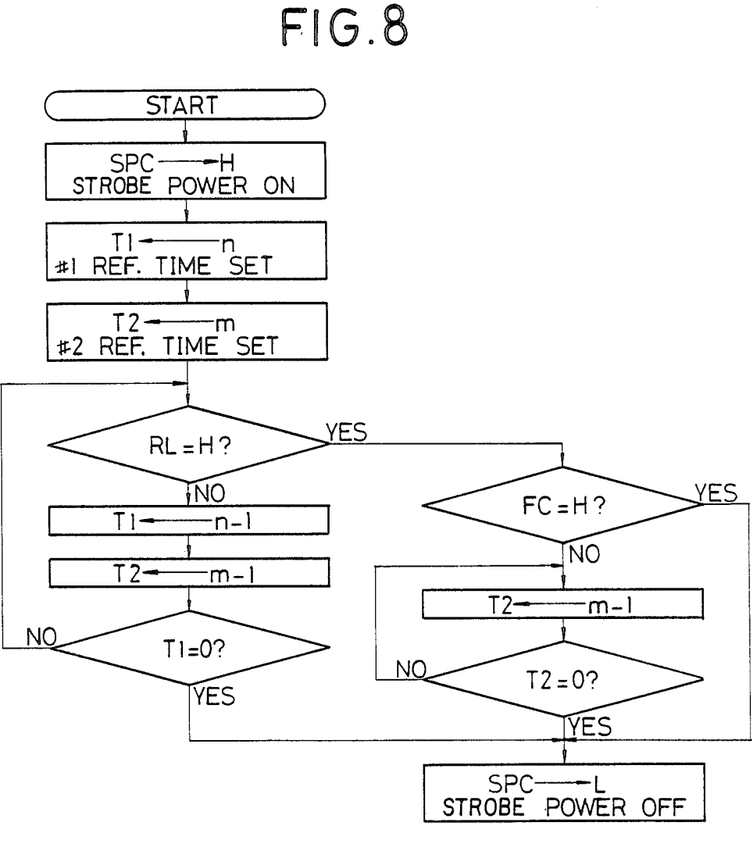
FIG. 8 is a flow-chart of an operation of another embodiment of the present invention.

FIG. 8 shows a flow-chart of the operation of the device in FIG. 6, where the time Tb is set as a time period measured from the charge start time.

In FIG. 8, when the battery E is connected to the flash unit 1 upon the battery control signal SPC, the first and second reference times Ta and Tb are set simultaneously as time periods measured from the charge start time and then it is determined whether or not the signal RL is produced within the first reference time Ta. If the determination is negative, the battery E is disconnected from the flash unit 1. If it is affirmative, it is determined whether or not the signal FC is produced within the second reference time Tb.

When the signal FC is not produced within the second reference time Tb, the battery E is disconnected from the flash unit 1. The disconnection is also performed when the signal FC is produced within the second reference time Tb. Thus, the battery E is prevented from being discharged completely.

Therefore, the battery E is disconnected from the flash unit 1 before the voltage Vcc thereof is reduced to a level in which it is impossible to drive the motor.

Thus, a certain amount of the battery energy which is still enough to drive the motor lastly is kept.

In the embodiment shown in FIG. 6, the battery E is disconnected even if the charge completion signal FC is produced within the second reference time Tb for the purpose of the battery safety. However, it may be possible to continue the charging of the main capacitor C3 of the flash unit 1 when the signal FC is not produced within the second reference time Tb.

In the embodiments described hereinbefore, the acceptable condition of the battery is indicated by an absence of positive indication thereof while the consumption of the battery is indicated by the positive indication such as light from the photoemissive diode. However, the indication may be reversed or different positive indications may be employed to show the respective conditions of the battery.

What is claimed is:

1. A battery check device for a battery of a camera having an electronic strobe flash unit including a main capacitor, comprising a battery check circuit switchable to a first mode for checking a voltage of said battery during an automatic exposure mode of said camera in which said flash unit is inoperative, a second mode for checking the voltage during a synchronous flash mode of said camera in which said flash uni is operative, and switching means for switching said camera between said automatic exposure mode and said synchronous flash mode so that either said first mode or said second mode is selected.

2. A battery check device according to claim 1, wherein comprises a first reference time setting circuit for setting a first reference time measured from a selection of said synchronous flash mode by said switching means, said first reference time being longer than a nominal time in which said main capacitor is charged by a nominal value of said battery voltage to a level at which said flash unit is operable, first means for comparing said first reference time with a first time period from said selection of said synchronous flash mode and during which said main capacitor is being charged to said level and for providing an output when said first time period is longer than said first reference time, and indicator means responsive to said output of said first means for indicating a consumption condition of said battery.

3. The battery check device as claimed in claim 1, wherein said first reference time setting means comprises a time constant circuit including a capacitor and a resister connected in series with said capacitor and said first means comprises a logic comparator for comparing said first reference time with said first time period.

4. The battery check device as claimed in claim 1, wherein said first reference time setting means and said first means are included in a single CPU.

5. The battery check device as claimed in claim 1, further comprising a second reference time setting means for setting a second reference time which is longer than a time period in which the charging of said main capacitor by said nominal battery voltage is completed, a second means for comparing said second reference time with a second time period in which said charging of said main capacitor is completed and providing an output when said second time period is longer than said second reference time and means responsive to said output of said second means for disconnecting said battery from said electronic strobe flash unit.

6. The battery check device as claimed in claim 3, wherein said first and second reference time setting means and said first and second means are included in a single CPU.

* * * * *